United States Patent
Thielen et al.

(10) Patent No.: US 6,949,132 B2
(45) Date of Patent: *Sep. 27, 2005

(54) AXIAL DEGASSING TRANSFER LINES

(75) Inventors: Thomas Thielen, Plymouth, MN (US); Yuri Gerner, Mendota Heights, MN (US); Carl W. Sims, St. Paul, MN (US)

(73) Assignee: Systel, LLC, New Brighton, MN (US)

( * ) Notice: Subject to any disclaimer, the term of this patent is extended or adjusted under 35 U.S.C. 154(b) by 45 days.

This patent is subject to a terminal disclaimer.

(21) Appl. No.: 10/702,013

(22) Filed: Nov. 5, 2003

(65) Prior Publication Data

US 2005/0092182 A1 May 5, 2005

(51) Int. Cl.⁷ ............................................... B01D 19/00
(52) U.S. Cl. ...................... 96/6; 96/8; 95/46; 73/61.55
(58) Field of Search ............................ 96/6, 8, 10, 155; 95/46, 241; 73/61.55

(56) References Cited

U.S. PATENT DOCUMENTS

| | | |
|---|---|---|
| 3,668,837 A | 6/1972 | Gross |
| 3,751,879 A | 8/1973 | Allington |
| 4,133,767 A | 1/1979 | Bakalyar et al. |
| 4,325,715 A | 4/1982 | Bowman et al. |
| 4,430,098 A | 2/1984 | Bowman et al. |
| 4,469,495 A | 9/1984 | Hiraizumi et al. |
| 4,729,773 A | 3/1988 | Shirato et al. |
| 4,834,877 A | 5/1989 | Peters et al. |
| 4,923,679 A | 5/1990 | Fukasawa et al. |
| 4,986,837 A | 1/1991 | Shibata |
| 4,994,180 A | 2/1991 | Sims et al. |
| 5,183,486 A | 2/1993 | Gatten et al. |
| 5,205,844 A | 4/1993 | Morikawa |
| 5,290,340 A | 3/1994 | Gatten et al. |
| 5,340,384 A | 8/1994 | Sims |
| 5,383,483 A | 1/1995 | Shibano |
| 5,425,803 A | 6/1995 | van Schravendijk et al. |

(Continued)

FOREIGN PATENT DOCUMENTS

| | | |
|---|---|---|
| JP | 03-221130 | 9/1991 |
| JP | 03-224602 | 10/1991 |
| JP | 05-068808 | 3/1993 |
| SU | 0871806 | 10/1981 |

OTHER PUBLICATIONS

S.R. Bakalyar et al., "The Role of Dissolved Gases in High–Performance Liquid Chromatography", Journal of Chromatography, 158 (1978) 277–293.

(Continued)

*Primary Examiner*—Duane Smith
*Assistant Examiner*—Douglas J. Theisen
(74) *Attorney, Agent, or Firm*—Haugen Law Firm PLLP

(57) ABSTRACT

An elongated flow-through vacuum degassing apparatus includes an elongated gas and liquid impermeable outer tube and one or more gas-permeable, liquid-impermeable elongated inner tubes extending coaxially within the outer tube. The degassing apparatus further includes a vacuum source adaptor extending from a side wall of the outer tube and co-extensively with a vacuum source coupling aperture in the outer tube so as to create a sealed axial vacuum chamber between the outer tube and the inner tubes. The apparatus also includes inlet and outlet connection structures operably coupled to respective portions of the outer tube and the inner tubes to further enable a sealed engagement between the outer tube and the inner tubes, and to provide for connection devices for operably coupling the degassing apparatus of the present invention to respective components in a chromatographic system. The degassing apparatus is sufficiently flexible so as to be readily manipulatable into desired configurations.

3 Claims, 4 Drawing Sheets

U.S. PATENT DOCUMENTS

| | | | |
|---|---|---|---|
| 5,584,914 | A | 12/1996 | Senoo et al. |
| 5,762,684 | A | 6/1998 | Hayashi et al. |
| 5,788,742 | A | 8/1998 | Sugimoto et al. |
| 5,989,318 | A | 11/1999 | Schroll |
| 6,248,157 | B1 * | 6/2001 | Sims et al. ............. 96/6 |
| 6,309,444 | B1 | 10/2001 | Sims et al. |
| 6,494,938 | B2 * | 12/2002 | Sims et al. ............. 96/6 |
| 6,675,835 | B2 * | 1/2004 | Gerner et al. ......... 138/30 |
| 6,837,992 | B2 | 1/2005 | Gerner et al. |

OTHER PUBLICATIONS

Ingo Pinnau et al, "Gas and Vapor Transport Properties of Amorphous Perfluorinated Copolymer Membranes Based on 2, 2–Bistrifluoromethyl–4,5–Difluoro–1,3–dioxole/tetrafluoroethylene", Journal of Membrane Science 109 (1996) 125–133.

DuPont article, Teflon AF (amorphous fluoropolymers), Properties of Amorphous Fluoropolymers Based on 2.2–Bistrifluoromethyl–4,5–Difluoro–1,3–Dioxole, 183rd Meeting of Electrochemical Society, Honolulu, HI May 17, 1993.

Nemser, S., Applications of Membranes in Industry Glassy Fluoropolymer Membranes, 21 Aharon Katzir–Katchalsky Conference Rehovot, Israel, Sep. 5–8, 1993.

* cited by examiner

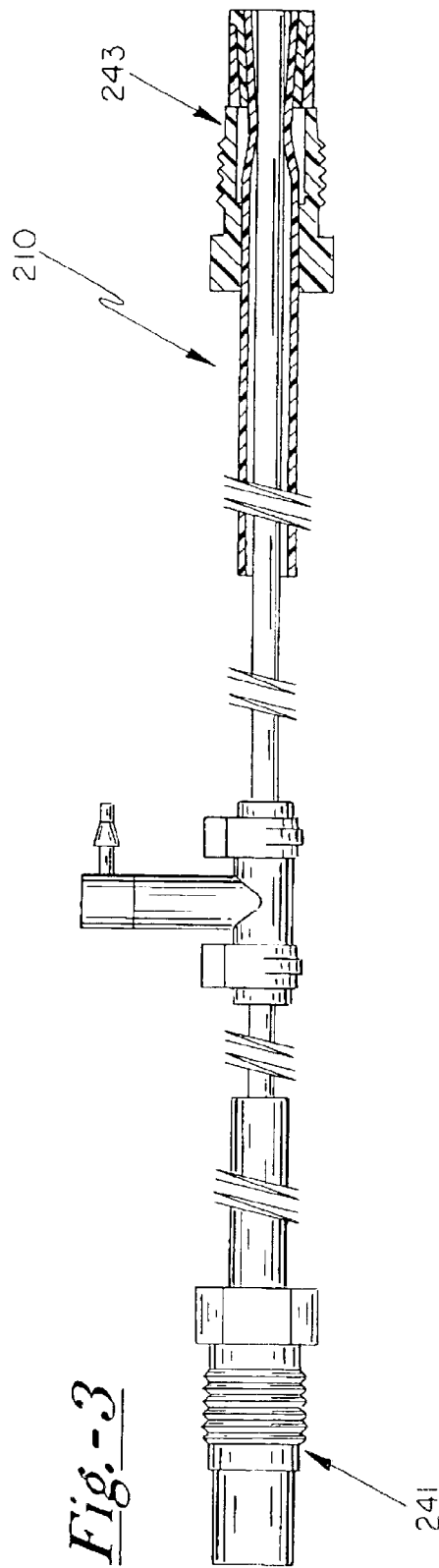
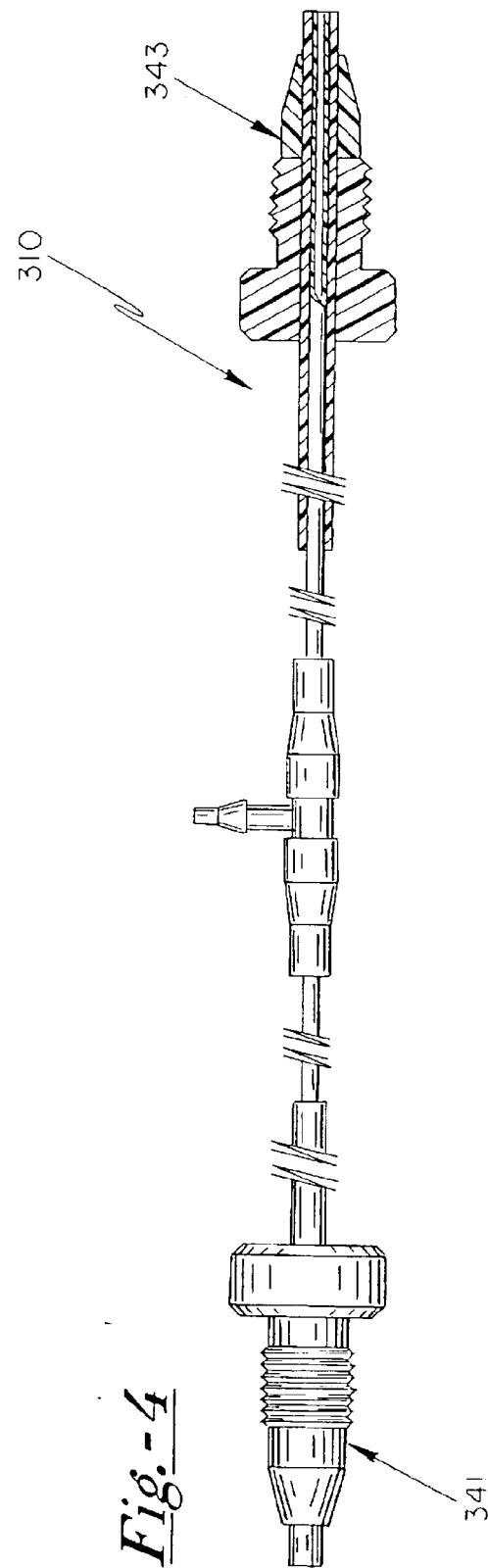
Fig.-3
Fig.-4

AXIAL DEGASSING TRANSFER LINES

FIELD OF THE INVENTION

The present invention relates generally to systems for degassing fluids utilized in a wide variety of applications, including the degassing of chromatographic fluids, inks, semiconductor processing fluids, beverages, and laboratory-grade fluids and more particularly to a flow-through transfer line degassing apparatus wherein transfer lines extending between respective components in systems incorporating such an apparatus simultaneously act to operably degas fluids passing therethrough.

BACKGROUND OF THE INVENTION

There are many chemical applications, particularly analytical applications involving the use of liquid solvents, reactants or the like in which the presence of dissolved gases, and particularly air, is undesirable. A prime example of such an application relates to the fluids utilized in liquid chromatography where the presence of even small amounts of dissolved gases interferes with the accuracy and sensitivity of the results obtained. For example, air dissolved in the mobile phase can manifest itself in the form of bubbles which causes noise and drift as the mobile phase passes through the chromatographic detector. In situations where the dissolved gases are chemically active, unwanted modifications or deterioration in the chromatographic fluids can occur. Therefore, it is desirable to remove such species through a degassing process.

The degassing of liquid materials has been necessary to the success of many processes, and, consequently, various degassing methods have been employed for some time. Techniques have included heating or boiling the fluid to be degassed, exposing the material to a reduced pressure environment or vacuum, and using combination of heat and vacuum to reduce the amount of dissolved gases in the fluid. Ultrasonic energy has also been employed for such degassing purposes. As conventionally applied, however, these traditional techniques have generally fallen short of the desired degree of separation efficiency.

Vacuum degassing through a membrane apparatus has long been known, and generally utilizes a length of relatively small diameter, thin-walled, semi-permeable synthetic polymer resin material contained within an enclosed chamber held under a reduced pressure or vacuum in which the fluid to be degassed is caused to flow through the tube. One such apparatus is shown by Sims in U.S. Pat. No. 5,340,384, assigned to the same Assignee as in the present invention. Other such devices are shown in U.S. Pat. Nos. 5,183,486; 4,430,098; and 3,668,837.

While each of these devices employ a vacuum degassing approach, there remains a need, particularly with devices associated with liquid chromatography instruments, to provide a fluid degassing capability in fluid transfer lines operably coupling respective components of such chromatographic instruments. In conventional degassing systems, chromatographic fluids are routed into a distinct vacuum chamber for performing the degassing function thereat. In such a manner, a separate and distinct component must be incorporated into the chromatographic instrument assembly. Moreover, fluid transfer lines must be routed from respective fluid reservoirs to a distinct vacuum chamber prior to such fluid flow through the chromatographic instruments.

It is therefore a principle object of the present invention to provide fluid transfer lines as axially-disposed individual degassing chambers.

It is another object of the present invention to provide chromatographic fluid transfer lines which are operably coupled to vacuum sources so as to enable vacuum-type degassing upon the fluids passing therethrough.

It is a yet further object of the present invention to provide an elongated flow-through vacuum degassing apparatus having an outer impermeable tube and one or more semi-permeable inner tubes disposed coaxially therewithin, with fluids passing either through or around the inner semi-permeable tubes in a relatively low-pressure environment between the outer tube and the inner tubes so as to effect a vacuum degassing characteristic upon the semi-permeable inner tubes.

It is a still further object of the present invention to provide an elongated flow-through transfer line vacuum degassing apparatus having an outer tube and one or more inner tubes coaxially disposed therewithin, and wherein the inner tubes are formed from an amorphous perfluorinated copolymer material.

It is another object of the present invention to provide an elongated transfer line vacuum degassing apparatus that is sufficiently flexible so as to be readily manipulatable into desired configurations.

SUMMARY OF THE INVENTION

By means of the present invention, fluids may be operably degassed in distinct transfer lines extending between respective components in an associated fluid flow system. The transfer lines of the present invention are preferably configured as axially-disposed individual degassing chambers having an elongated outer tube fabricated from liquid and gas impermeable material, and one or more semi-permeable inner tubes disposed coaxially therewithin. The outer tube is preferably configured so as to form a gas-tight seal at opposed ends thereof, such that a chamber is formed within the outer tube, through which the inner tube extend. The outer tube is preferably operably coupled to a vacuum source, such that the chamber defined between the outer tube and the inner tubes is operably maintained in a relatively low pressure environment so as to effect a vacuum degassing characteristic upon fluids passing through the semi-permeable inner tubes. The outer and inner tubes, in combination, are preferably sufficiently flexible so as to be readily manipulatable into desired configurations.

In a particular embodiment of the present invention, the elongated flow-through vacuum degassing apparatus includes an elongated outer tube that is gas and liquid impermeable, and has an inlet end, an outlet end, and a vacuum source coupling aperture formed in a side wall thereof. The degassing apparatus further includes an elongated inner tube extending coaxially within the outer tube, with the inner tube being formed of a gas-permeable, liquid-impermeable polymeric material, and which has an inlet portion and an outlet portion corresponding to the inlet and outlet ends of the outer tube. In addition, a vacuum source adaptor extends from the side wall of the outer tube and co-extensively with the vacuum source coupling aperture such that a hollow channel extending through the vacuum source adaptor provides for fluid connection from a space defined between the outer tube and the inner tube to locations external to the vacuum source adaptor. The apparatus of the present invention further includes an inlet connection apparatus operably coupled to the inlet end of the outer tube and the inlet portion of the inner tube, and an outlet connection apparatus operably coupled to the outlet end of the outer tube and the outlet portion of the inner tube.

The degassing apparatus is preferably sufficiently flexible so as to be readily manipulatable. The inner tube is preferably fabricated from an amorphous perfluorinated copolymer material, while the outer tube is selected from the group consisting of stainless steel, FEP, and PEEK.

BRIEF DESCRIPTION OF THE DRAWINGS

FIG. 3 is a partial cut-away view of a degassing apparatus of the present invention incorporating a particular configuration for the inlet and outlet connection means;

FIG. 4 is a partial cut-away view of a degassing apparatus of the present invention incorporating a particular configuration for the inlet and outlet connection means;

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
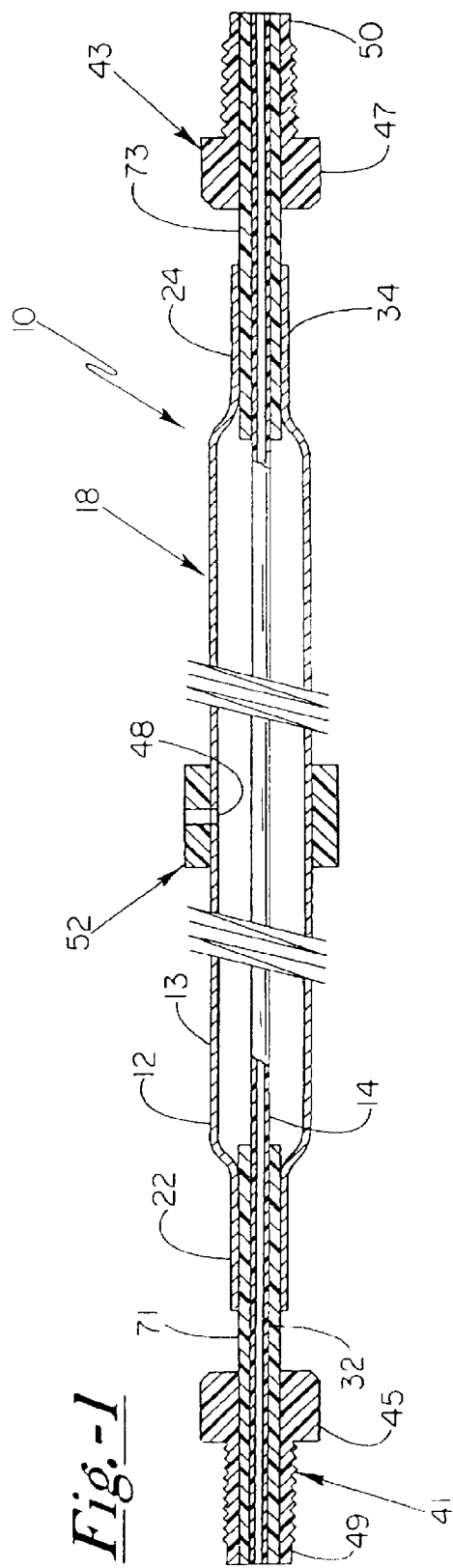
FIG. 1 is a cross-sectional view of a transfer line degassing apparatus of the present invention.

With reference now to the drawings, and first to FIG. 1, a transfer line degassing apparatus 10 of the present invention includes an outer tube 12 and an inner tube 14 disposed coaxially within outer tube 12. Outer tube 12 preferably forms an elongated sealed housing through which inner tube 14 extends.

As illustrated in FIG. 1, outer tube 12 includes an inlet end 22 and an outlet end 24, with inner tube 14 having a corresponding inlet portion 32 and outlet portion 34. Inlet and outlet connection means 41, 43 are preferably operably coupled to respective inlet and outlet ends 22, 24 of outer tube 12, and to inlet portions 32, 34 of inner tube 14. Inlet and outlet connection means 41, 43 are preferably configured so as to operably provide a gas-tight coupling at respective inlet and outlet ends 22, 24 of outer tube 12, as between outer tube 12, respective connection means 41, 43 and inner tube 14 thereat. As such, the portion of outer tube 12 between inlet end 22 and outlet end 24 forms a sealed chamber 18 through which inner tube 14 passes.

A vacuum source coupling aperture 48 is preferably formed in the sidewall of outer tube 12 and extends therethrough, such that the space between outer tube 12 and inner tube 14 is fluidly connected to an environment external to apparatus 10 via aperture 48. In preferred embodiments of the present invention, a vacuum source adapter 52 extends from the sidewall 13 of outer tube 12 and coextensively with aperture 48. Vacuum source adaptor 52 is preferably configured so as to be operably coupled to a vacuum source, whereby open space with chamber 18 may be substantially evacuated during use. In such a manner, fluids flowing through inner tube 14 at locations within the chamber 18 are caused to be degassed, as governed by Henry's Law of Partial Pressure. As such, gas entrained within fluid passing through inner tube 14 will have the tendency to be drawn through the gas-permeable, liquid-impermeable material forming inner tube 14, and into the relatively low pressure environment within chamber 18. Gas that is so drawn from the fluid within inner tube 14 is consequently removed from chamber 18 via aperture 48, which is operably coupled to a vacuum source.

In other embodiments of the present invention, gas drawn from the fluid within inner tube 14 may be removed from chamber 18 via a sweep fluid flowing therethrough. Such a sweep fluid may be in a gaseous or liquidous form, and preferably flows into and out from chamber 18 through corresponding ports in outer tube 12. Preferably, such sweep fluid flows counter to the flow direction of the liquid being degassed, such that the efficiency of liquid degassing is enhanced. To effectively degas the target liquid, the sweep fluid preferably has a relatively low partial pressure (gas) or concentration (liquid) with respect to the gaseous species being operably removed from the liquid.

In still further embodiments of the present invention, the fluids to be degassed may be directed through chamber 18, as defined between inner tube 14 and outer tube 12, while a vacuum or sweeping fluid is obtained within inner tube 14. In such a manner, the degassing function operates in the reverse direction, with gas entrained within the fluid being drawn by partial pressure through inner tube 14, and into the vacuum or sweep fluid contained therewithin. In such an embodiment, the vacuum or sweep fluid is operably coupled to one or more ports for removal of the permeated gas. Certain advantages are incorporated into the degassing system when the fluid to be degassed is directed through chamber 18 between outer tube 12 and the one or more inner tubes 14. For instance the fluid to be degassed in exposed to a relatively larger gas-permeable separation media surface area, in that the outer diameter of inner tube 14 is greater than the inner diameter thereof. This characteristic leads to a relatively higher degassing efficiency for a particular system.

An important aspect of the present invention is in providing transfer line degassing apparatus 10 with a flexibility characteristic that is sufficient so as to be readily manipulatable into desired configurations. To be effectively used as a transfer line for operably transporting, i.e., chromatographic fluids from one point to another within a respective chromatographic system, apparatus 10 is preferably flexible and conformable, whereby inlet connection means 41 may be operably coupled to an upstream component such as a fluid reservoir, and the outlet connection means 43 operably coupled to a downstream component, such as a blending valve apparatus or chromatographic column. Since connections between such components vary by manufacturer as well as by chromatographic system type, apparatus 10 may preferably conform to a particular user's configurational needs. Accordingly, outer tube 12 may be fabricated from a variety of materials, so long as the material flexibility characteristics, relatively low gas and liquid impermeability, and tubing caliber are such so as to obtain the above-stated characteristics. Outer tube 12 may therefore be fabricated from, for example, stainless steel, FEP or PEEK.

In preferred embodiments of the present invention, inner tube 14 is fabricated from a gas-permeable, liquid-impermeable material that is relatively inert and is relatively flexible. A particularly preferred material for use in fabricating inner tube 14 is an amorphous perfluorinated copolymer, such as that marketed by DuPont under the trade name Teflon® AF. Such materials have gas permeabilities of up to about 2 or 3 orders of magnitude higher than conventionally-utilized PTFE. Due to the relatively higher gas-permeabilities of the Teflon® AF material, greater gas mass transfer rates may be achieved with tubes of Teflon® AF having increased wall thicknesses, thereby permitting the undertaking of applications requiring higher pressure. Advantageously, tubes of smaller internal diameter and shorter length offer reduced internal volumes, which thereby assist in reducing system startup times. Moreover, such amorphous perfluorinated copolymers are sufficiently flexible so as to abide by the flexibility characteristics desired in the present invention.

A variety of configurations for inlet and outlet connection means 41, 43 are contemplated by the present invention. In the embodiment illustrated in FIG. 1, inlet and outlet connection means 41, 43 include dual-shrink tubing 71, 73 disposed in surrounding relationship to respective inlet and outlet portions 32, 34 of inner tube 14. Such tubing sections 71, 73 are preferably heat shrunk about respective portions of inner tube 14, while inlet and outlet ends 22, 24 of outer tube 12 are preferably sealingly engaged with an outer surface of respective tubing sections 71, 73 so as to obtain a sealed engagement between outer tube 12, respective tubing sections 71, 73, and inner tube 14. Inlet and outlet connection means 41, 43 further include nuts 45, 47 in conjunction with a pair of ferrules 49, 50 and which, in combination, are formed in surrounding relationship to tubing sections 71, 73 for connecting apparatus 10 between respective chromatographic system components.

Figure 2:
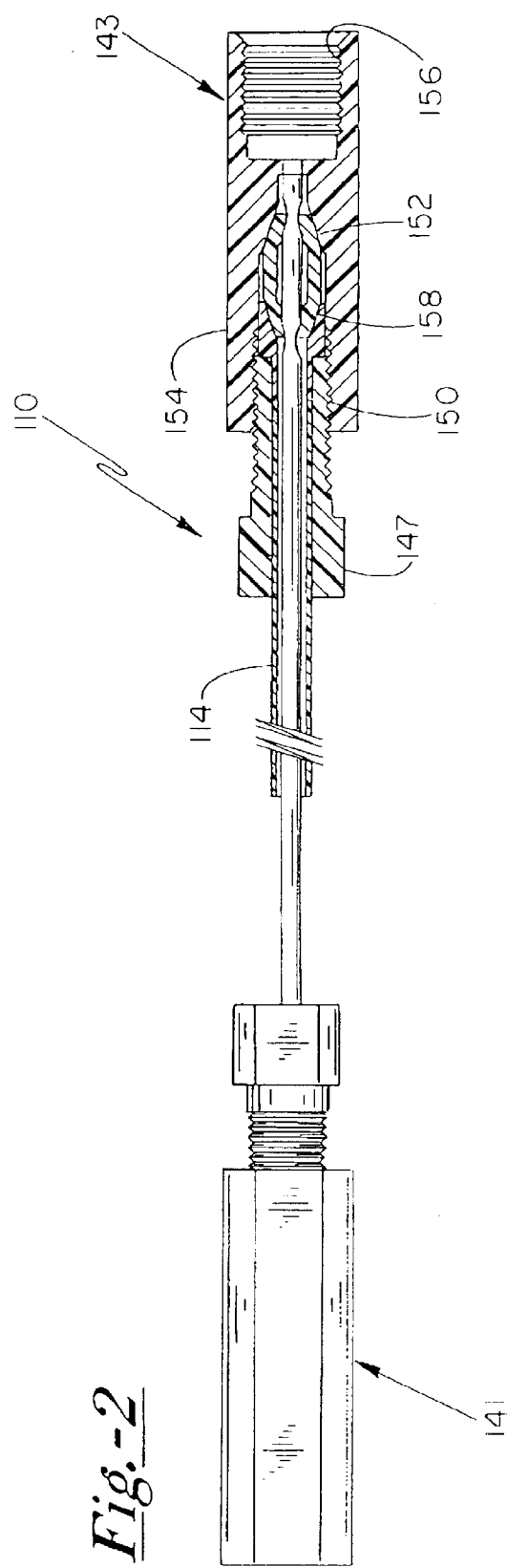
FIG. 2 is a partial cut-away view of a degassing apparatus of the present invention incorporating a particular configuration for the inlet and outlet connection means.

FIGS. 2–4 illustrate alternative configurations for the inlet and outlet connection means of the present invention. Specifically, apparatus 110 in FIG. 2 illustrates a female-type fitting comprising inlet and outlet connection means 141, 143. As shown in the enlarged view of outlet connection means 143 in FIG. 2, nut 147 operably engages a seat 150, which seat 150 acts as an intermediary object to transmit force against double sided ferrule 152. Progressive threaded engagement of nut 147 within receptacle 154 causes ferrule 152 to progressively press against a first end 158 of double ended ferrule 152. Progressive compression of ferrule 152 results in a formation of both a liquid and a gas-tight seal surrounding inner tube 114. Receptacle 154 further includes a threaded opening 156 that is specifically configured for threadably receiving a fluid transfer line connector component (not shown) therein.

Apparatus 210 and apparatus 310 illustrated in FIGS. 3 and 4 depict male fittings of various configurations for respective inlet and outlet connection means 241, 243 and 341, 343. Such configurations illustrated in FIGS. 2–4 are exemplary only, and do not in any way restrict the scope of the present invention in its utilization of connection means having various known configurations. Preferably, however, the respective connection means utilized in a particular degassing apparatus of the present invention operably correspond and engage with respective components of an associated chromatographic system.

Figure 5:
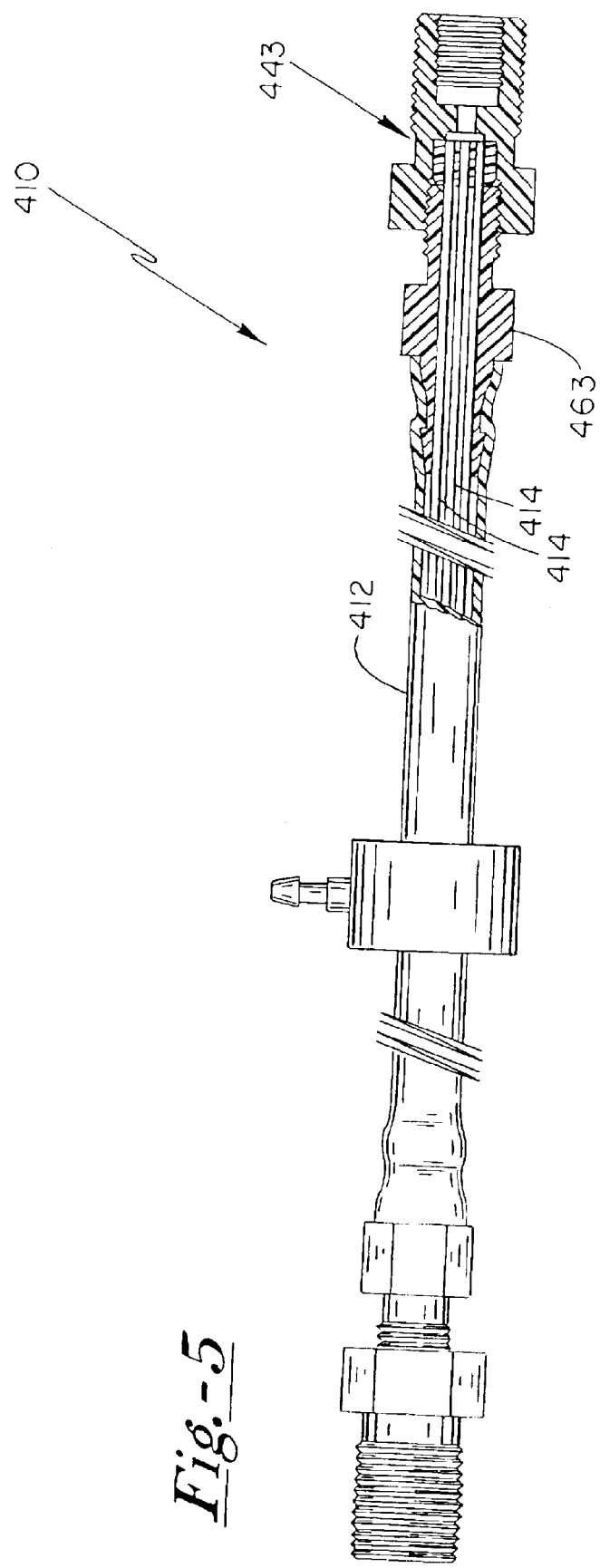
FIG. 5 is a cross-sectional view of a transfer line degassing apparatus of the present invention.
Figure 6:
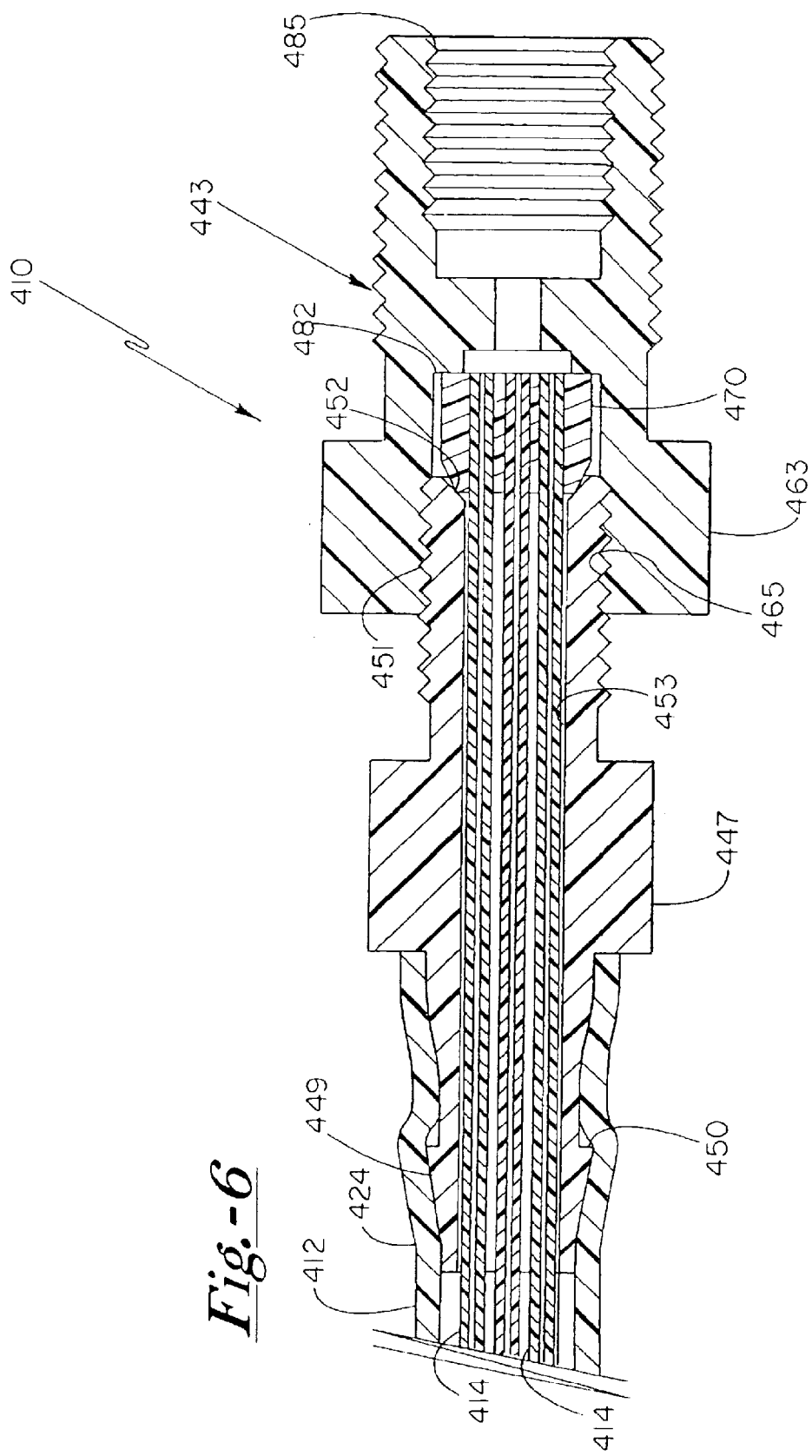
FIG. 6 is an enlarged view of a portion of the degassing apparatus illustrated in FIG. 5.

Another embodiment of the present invention is illustrated in FIGS. 5–6, wherein an apparatus 410 incorporates a plurality of semi-permeable inner tubes 414 extending through outer tube 412. In such a manner, a relatively higher surface area of semi-permeable tubing is exposed to the low pressure environment within the interior space defined by outer tube 412. As may be seen more clearly in FIG. 6, connection means 443 incorporates first nut 447 having a first barbed end 449 and a second threaded end 451 extending divergently with respect to first end 449. First nut 447 includes a central bore 453 through which semi-permeable tubes 414 extend.

In preferred embodiments, outlet end 424 of outer tube 412 is preferably operably press fit about first barbed end 449 of nut 447 so as to obtain a gas-tight seal therebetween. Barbed end 449 of nut 447 assists in retaining outer tube 412 in a fixed engagement therewith, in that annular barb 450 inhibits movement of outer tube 412 with respect thereto.

Second threaded end 451 of first nut 447 is preferably threadably engageable with second nut 463. In particular, threaded end 451 of nut 447 is threadably engageable with threaded opening 465 of second nut 463. As shown in FIG. 6, threaded engagement of first nut 447 into nut 463 results in compressive contact between end 452 of nut 447 and ferrule 470. Such compressive contact operably forces ferrule 470 against first inner boss 482 of second nut 463 so as to obtain a fluid-tight seal therebetween. As such, fluid exiting respective inner tubes 414 flows through second open end 485 of second nut 463, and does not leak into and out from threaded opening 465 thereof. Preferably, a fluid transfer line connector (not shown) may be operably coupled to second open end 485 of second nut 463 so as to maintain fluid containment throughout the associated chromatographic system. Preferably, first and second nuts 447, 463 and ferrule 470 are fabricated from relatively durable and inert materials such as stainless steel and the like. Ferrule 470 is also preferably fabricated so as to moderately deform under contact pressure generated through the progressive threaded engagement of nut 447 into nut 463. Such deformation of ferrule 470 accommodates the fluid-tight engagement to first bossed portion 482 of second nut 463.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. An elongated flow-through degassing apparatus for degassing one or more fluids passing therethrough, said degassing apparatus comprising:

(a) an elongated outer tube being relatively gas and liquid impermeable, said outer tube having an inlet end, an outlet end, and one or more apertures, said one or more apertures being formed in a side wall of said outer tube;

(b) one or more elongated inner tubes extending coaxially within said outer tube, said inner tubes being formed of a gas-permeable, liquid-impermeable polymeric material, and having an inlet portion and an outlet portion corresponding to said inlet and outlet ends of said outer tube;

(c) one or more adapters extending from said side wall of said outer tube and coextensively with one or more apertures such that a hollow channel extending through said one or more adapters provides for fluid connection from a space defined between said outer tube and said one or more inner tubes to locations external to said one or more adapters;

(d) inlet connection means operably coupled to said inlet end of said outer tube and said inlet portion of said inner tubes; and (e) outlet connection means operably coupled to said outlet end of said outer tube and said outlet portion of said inner tubes, said degassing apparatus being sufficiently flexible so as to be readily manipulatable into desired configurations.

2. A degassing apparatus as in claim 1 wherein said inner tubes are an amorphous perfluorinated copolymer material.

3. A degassing apparatus as in claim 1 wherein said outer tube is selected from the group consisting of stainless steel, FEP, and PEEK.

* * * * *